US008903241B2

(12) United States Patent
Gerstel et al.

(10) Patent No.: US 8,903,241 B2
(45) Date of Patent: Dec. 2, 2014

(54) REGISTRATION OF DEVICE CHARACTERISTICS WITH OPTICAL LAYER FOR USE IN ESTABLISHING CONNECTIONS THROUGH AN OPTICAL NETWORK

(71) Applicants: Ornan Alexander Gerstel, Herzelia (IL); David Delano Ward, Somerset, WI (US)

(72) Inventors: Ornan Alexander Gerstel, Herzelia (IL); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/956,038

(22) Filed: Jul. 31, 2013

(65) Prior Publication Data
US 2013/0315600 A1 Nov. 28, 2013

Related U.S. Application Data

(63) Continuation of application No. 12/355,921, filed on Jan. 19, 2009, now Pat. No. 8,521,026.

(51) Int. Cl.
*H04J 14/02* (2006.01)
*H04Q 11/00* (2006.01)

(52) U.S. Cl.
CPC ........ *H04J 14/02* (2013.01); *H04Q 2011/0088* (2013.01); *H04J 14/0256* (2013.01); *H04Q 11/0062* (2013.01); *H04J 14/0267* (2013.01); *H04Q 2011/0086* (2013.01); *H04J 14/0254* (2013.01); *H04Q 2011/0079* (2013.01); *H04J 14/0275* (2013.01)
USPC .............................................. 398/82; 398/79

(58) Field of Classification Search
USPC .................................. 398/23–25, 34, 79, 140
See application file for complete search history.

(56) References Cited

U.S. PATENT DOCUMENTS 7,355,983 B2  4/2008 Scudder et al.
2008/0304824 A1* 12/2008 Barbieri et al. .................. 398/38

OTHER PUBLICATIONS

Pennell, Tim, Cisco Systems, Inc., "IP-over-DWDM," 2nd NGN Workshop, Municon, Munich Airport, Germany, Apr. 4, 2008, 45 pages.
"Fundamental of DWDM Technology," Introduction to DWDM Technology, Chapter 2, 22 pages.
"10 Gigabit Ethernet Dense Wavelength-Division Multiplexing Interconnections in Enterprise Campus Networks," Cisco Systems, Inc., 2006 14 pages.
Aboul-Magd et al., "Optical Link Interface Requirements," draft-ietf-ccamp-oli-reqits-00.txt, Internet Engineering Task Force, Feb. 2002, 13 pages.

(Continued)

*Primary Examiner* — Armando Rodriguez
(74) *Attorney, Agent, or Firm* — The Law Office of Kirk D. Williams

(57) ABSTRACT

Disclosed are, inter alia, methods, apparatus, computer-storage media, mechanisms, and means associated with registration of optical device characteristics of optical network devices with an optical control layer of the optical network for use in establishing compatible connections through the optical network. Especially end network devices and internal network optical devices that regenerate the optical signal register their communication capabilities of their optical interfaces with the optical control layer of an optical network. This registration allows a light path to be established through the optical network which is compatible with the registered capabilities. The optical control layer may be centralized in an optical layer server and/or distributed among optical devices in the optical network, such as on control processors in multiple, optical layer devices.

20 Claims, 7 Drawing Sheets

(56) References Cited

OTHER PUBLICATIONS

Martinelli & Zanardi, eds., "GMPLS Signaling Extensions for Optical Impairment Aware Lightpath Setup," draft-martinelli-ccamp-optical-imp-signaling-01.txt, Internet Engineering Task Force, Feb. 22, 2008, 19 pages.

Kompella & Rekhter, eds., "Routing Extensions in Support of Generalized Multi-Protocol Label Switching (GMPLS)," RFC 4202, The Internet Society, Oct. 2005, 27 pages.

Fredette & Lang, eds., "Link Management Protocol (LMP) for Dense Wavelength Division Multiplexing (DWDM) Optical Line Systems," RFC 4209, The Internet Society, Oct. 2005, 16 pages.

Introduction to DWDM Technology, Cisco Systems, Inc., San Jose, CA, USA, Jun. 4, 2001, 66 pages.

\* cited by examiner

REGISTRATION OF DEVICE CHARACTERISTICS WITH OPTICAL LAYER FOR USE IN ESTABLISHING CONNECTIONS THROUGH AN OPTICAL NETWORK

CROSS-REFERENCE TO RELATED APPLICATIONS

This application is a continuation of U.S. patent application Ser. No. 12/355,921, filed Jan. 19, 2009, which is hereby incorporated by reference in its entirety.

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). Dense wavelength-division multiplexing (DWDM) is being used to carry more traffic over a single optical fiber. As the name suggests, this technology transmits multiple signals simultaneously at different wavelengths on a same fiber. In one application, DWDM technology is being used to expand the bandwidth capacity of existing backbone networks. In order to communicate between optical devices, a light path is configured through an optical network between the optical devices, with this light path possibly including an optical regenerator.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
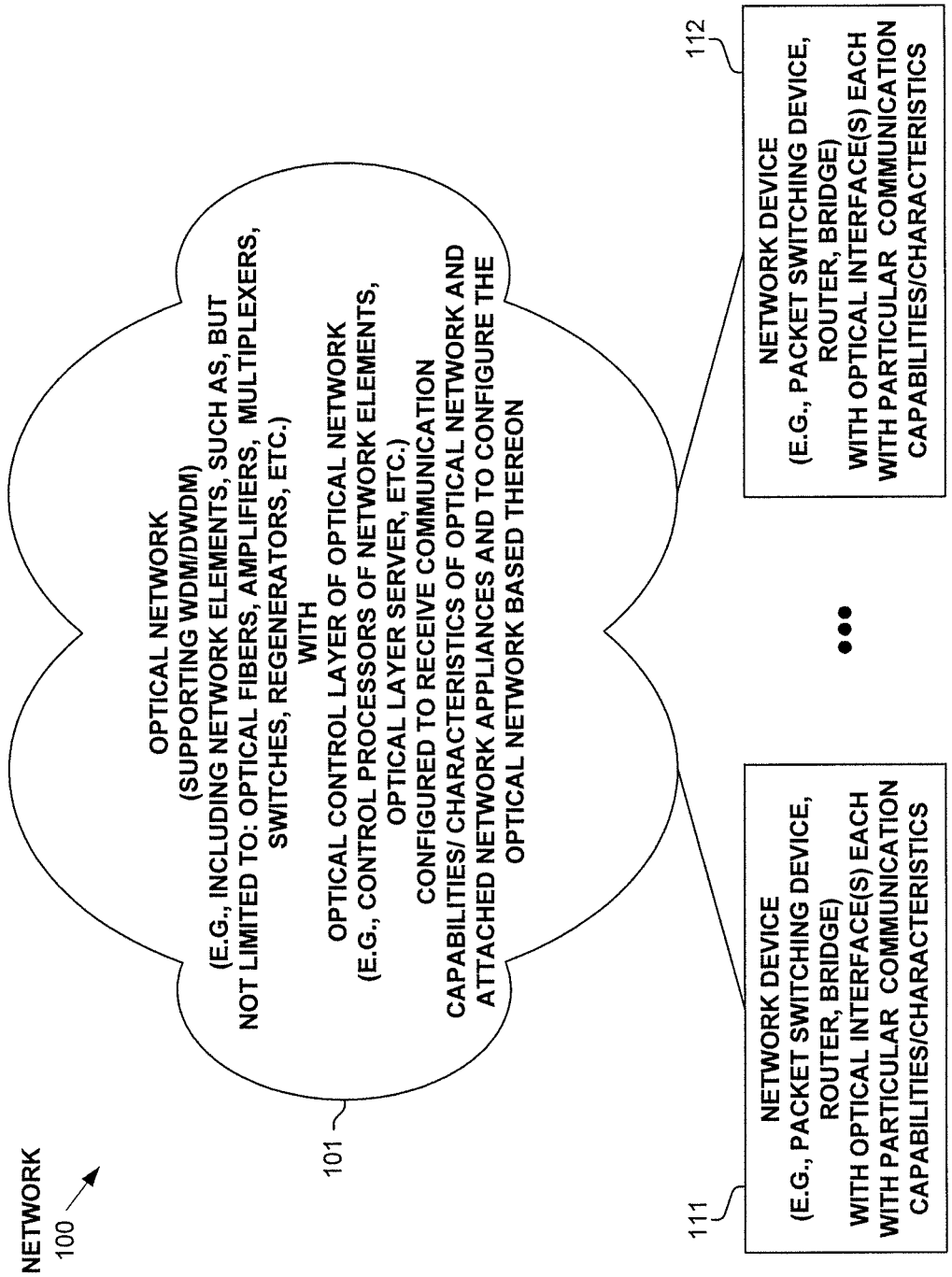
FIG. 1 illustrates a network operating according to one embodiment.

Disclosed are, inter alia, methods, apparatus, computer-storage media, mechanisms, and means associated with registration of optical device characteristics of optical network devices with an optical control layer of the optical network for use in establishing compatible connections through the optical network. In one embodiment, these network devices include, but are not limited to, packet switching devices, optical regenerators and/or other devices within the optical network or otherwise connected to the optical network. In one embodiment, the optical control layer includes, or simply is, an optical layer server (e.g., including a optical path computation engine and/or optical network management system). In one embodiment, the optical control layer is distributed among devices within the optical network, such as on control processors in multiple, optical layer devices. In one embodiment, the optical control layer includes both the distributed optical control layer and one or more optical layer servers.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention. Moreover, nothing described or referenced in this document is admitted as prior art to this application unless explicitly so stated.

The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with registration of optical device characteristics of optical network devices with an optical control layer of the optical network for use in establishing compatible connections through the optical network. In one embodiment, these network devices include, but are not limited to, packet switching devices, optical regenerators and/or other devices within the optical network or otherwise connected to the optical network. In one embodiment, the optical control layer includes, or simply is, an optical layer server (e.g., including a optical path computation engine and/or optical network management system). In one embodiment, the optical control layer is distributed among devices within the optical network, such as on control processors in multiple, optical layer devices. In one embodiment, the optical control layer includes both the distributed optical control layer and one or more optical layer servers.

One embodiment includes an apparatus, comprising: a plurality of optical interfaces, each configured for coupling with an optical fiber for communicating information using wavelength-division multiplexing (WDM) with an optical network, with each of the plurality of optical interfaces being characterized by a plurality of communication capabilities of its optical transmitter or receiver, with said communication capabilities including optical transmission characteristics for said optical transmitter and optical receiving characteristics for said optical receiver; and a controller configured to inform an optical control layer, outside the apparatus, of said communication capabilities of each of its said one or more optical interfaces for use in configuring the optical network to route compatible signals with the apparatus through the optical network.

In one embodiment, at least one of the plurality of optical interfaces has configurable alternative values of said communication capabilities; wherein the apparatus is configured to receive an identification of parameters according to said configurable alternative values from the optical control layer outside the apparatus; and wherein the apparatus is configured to configure said at least one of said optical interfaces to operate according to said received parameters for communicating over at least one of said optical fibers. In one embodiment, said optical control layer is distributed among a plurality of optical appliances in the optical network. In one embodiment, the apparatus receives the identification of parameters according to said configurable alternative values from the optical control layer in one of the plurality of optical appliances in the optical network. In one embodiment, said optical control layer includes a centralized optical layer server. In one embodiment, said communication capabilities that are said informed to the optical control layer for the optical transmitter include a range of transmitted power and frequency characteristics. In one embodiment, said communication capabilities that are said informed to the optical control layer for the optical transmitter include bit rate, modulation format, forward error correction type, signal format, and frame format characteristics. In one embodiment, said communication capabilities that are said informed to the optical control layer for the optical receiver include a range of valid input power and supported wavelength characteristics. In one embodiment, said communication capabilities that are said informed to the optical control layer for the optical receiver include bit rate, modulation format, forward error correction type, signal format, and frame format characteristics. In one embodiment, the controller is configured to inform the optical control layer of said communication capabilities of both said optical transmitter and receiver of each of its said one or more optical interfaces for use in configuring the optical network to route compatible signals with the apparatus through the optical network. In one embodiment, the apparatus is a router appliance. In one embodiment, the apparatus includes an optical regenerator coupled to at least two of the plurality of optical interfaces.

One embodiment includes an apparatus, comprising: an optical interface configured for coupling with one or more optical fibers for communicating information using wavelength-division multiplexing (WDM) with an optical network, with each of said one or more optical interfaces being characterized by a plurality of communication capabilities of its optical transmitter or receiver, with said communication capabilities including optical layer transmission characteristics for an optical transmitter and optical layer receiving characteristics for an optical receiver; and a controller configured to inform an optical layer server, external to the apparatus, of said communication capabilities of each of its said one or more optical interfaces for use in configuring the optical layer network to route compatible signals with the apparatus through the optical layer network.

In one embodiment, at least one of said optical interfaces has configurable alternative values of said communication capabilities; wherein the apparatus is configured to receive an identification of parameters according to said configurable alternative values from the optical layer server; and wherein the apparatus is configured to configure said at least one of said optical interfaces to operate according to said received parameters for communicating over at least one of said optical fibers. In one embodiment, the optical layer server is configured to perform network management functions. In one embodiment, the optical server is configured to perform path computations within the optical network based on optical characteristics registered with it including said communication capabilities of said one or more optical interfaces.

One embodiment includes an apparatus, comprising: one or more optical network interfaces coupled to an optical network including a plurality of network appliances, wherein each of the plurality of network appliances includes one or more particular optical interfaces configured for coupling with the optical network for communicating information using wavelength-division multiplexing (WDM), with each of said one or more particular optical interfaces being characterized by a plurality of communication capabilities of its optical transmitter or receiver, with said communication capabilities including optical layer transmission characteristics for an optical transmitter and optical layer receiving characteristics for an optical receiver; and one or more processors and memory configured, based on received communication capabilities of said optical interfaces of the plurality of network devices, to determine compatible light paths through the optical network optically communicatively coupling pairs of network devices of the plurality of network devices, and to cause the optical network to provide said determined compatible light paths.

In one embodiment, said configuring of the optical network includes determining one or more optical network devices within the optical network compatible with said communication capabilities of two particular network devices of the plurality of network devices; and in response to said determination of said compatible one or more optical network devices, including at least one of said compatible one or more optical network devices in one of said compatible light paths between said two particular network devices. In one embodiment, said compatible one or more optical network devices includes at least one optical regenerator. In one embodiment, at least one of said two particular network devices has configurable alternative values of said communication capabilities; and wherein the apparatus is configured to send an identification of parameters according to said configurable alternative values to said at least one of said two particular network devices for configuring at least one of its said one or more optical interfaces according to said parameters for communicating over at least one of said optical fibers. In one embodiment, said communication capabilities that are said received from each of the plurality of network devices include one or more of a group of communication capabilities consisting of: range of transmitted power, range of valid input power, and supported wavelength characteristics.

One embodiment includes a method performed by an optical control layer of an optical network, the method comprising: receiving, from each particular network device of a plurality of network devices communicatively coupled with the optical network, a registration of a plurality of selectable communication capabilities of the optical transmitters and optical receivers for communicating information by said particular network device over the optical network using wavelength-division multiplexing (WDM), with said communication capabilities including optical layer transmission characteristics for an optical transmitter and optical layer receiving characteristics for an optical receiver; selecting compatible communications capabilities for communicating with each other over the optical network of two particular network devices of the plurality of network devices from said registered selectable communication capabilities of said two particular network devices; and communicating respective said compatible communications capabilities to each of said two particular network devices for configuration by said two particular network devices for communicating over the optical network.

One embodiment includes causing the optical network to provide a compatible light path through the optical network between said two particular network devices. In one embodiment, said causing the optical network to provide a compatible light path through the optical network between said two particular network devices includes causing the optical network to provide said compatible light path through an optical regenerator. In one embodiment, the plurality of network devices includes the optical regenerator; with the method including: selecting compatible communications capabilities of the optical regenerator from said registered selectable communication capabilities of the optical regenerator for said two particular network devices to communicate over the optical network.

Expressly turning to the figures, FIG. 1 illustrates an example network 100 operating according to one or more embodiments. Shown are optical network 101 and two network devices 111 and 112 configured for communicating between themselves over optical network 101. Optical network 101 typically includes optical fibers and other optical equipment, such as, but not limited to amplifiers, multiplexers, switches, optical regenerators, etc. Examples of network devices 111 and 112 include, but are not limited to, packet switching devices (e.g., routers, bridges).

As show, network devices 111 and 112 are configured to register/inform the optical control layer of optical network 101 of their respective communication capabilities/characteristics for use by optical control layer of optical network 101 in determining compatible light paths through optical network 101. Additionally, one or more optical network elements register their respective communication capabilities/characteristics for use by optical control layer of optical network 101 in determining compatible light paths through optical network 101. After having registered their optical characteristics, including possibly registering alternative characteristics, the optical control layer can determine compatible light paths through the optical network, and inform the optical devices of optical characteristics to use in transmitting and/or receiving data. The list of communications capabilities that are possibly registered is extensible, and may typically include, but is not limited to, range of transmitted power, frequency characteristics, range of valid input power, supported wavelength characteristics, optical layer output power, wavelength characteristics, frequency characteristics, bit rate, modulation format, forward error correction type, signal format, and frame format characteristics. Additionally, a device may register alternatives supported by the device, possibly identifying default characteristics, and may possibly negotiate with the optical control layer of optical network 101 of optical characteristics to use in communicating over a light path through optical network 101. The operation of one embodiment will be described in relation to each of the flow diagrams of FIGS. 4A, 4B, 5A and 5B described hereinafter.

Figure 2:
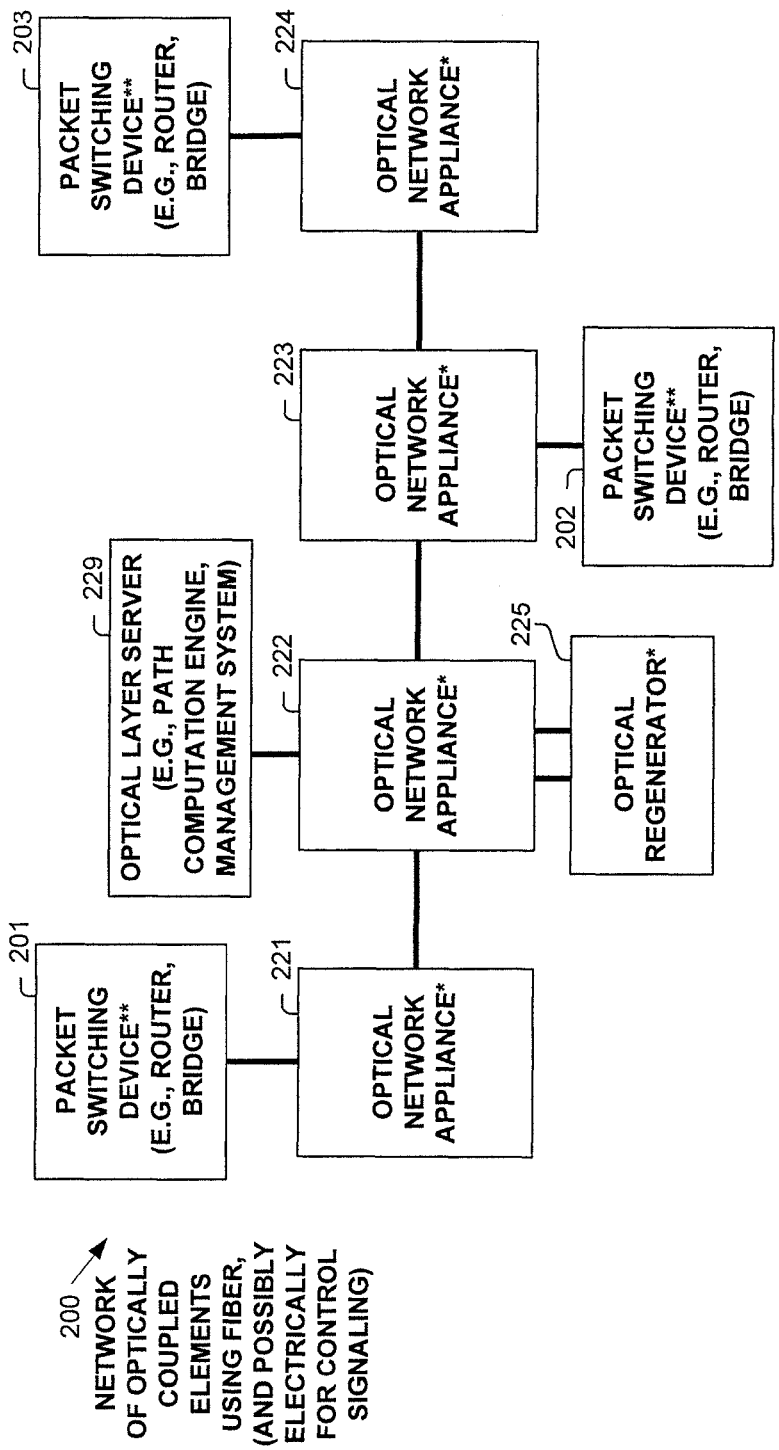
FIG. 2 illustrates a network operating according to one embodiment.

FIG. 2 illustrates an example network 200 operating according to one or more embodiments. Shown are optical network appliances (e.g., devices) 221, 222, 223, 224 and optical regenerator 225, an optional optical layer server 229 (e.g., path computation engine which is typically part of the control plane of an optical network, optical layer management system), and packet switching devices 201, 202 and 203. These optical network and packet switching devices are optically and/or electrically coupled as illustrated in this example network 200. Note, typically, the data is communicated over optical fibers, with control signals being communicated over a supervisor channel within the optical fibers and/or via an electrical communications network (e.g., a local area network). In one embodiment, the optical control layer includes optical layer server 229 which performs operations, such as, but not limited to computing light paths through optical network 200 based on registered optical interface characteristics, network management functions (e.g., optical network configuration, topology, monitoring and maintaining functions, etc.). In one embodiment, the optical control layer includes control processors of one or more, and possibly all, of optical network appliances 221-224. In one embodiment, the optical control layer includes control processors of one or more, and possibly all, of optical network appliances 221-224 as well as optical layer server 229. After having registered their optical characteristics, including possibly registering alternative characteristics, the optical control layer (whether within optical layer server 229 and/or distributed among optical network appliances 221-224) can determine compatible light paths through the optical network, and inform the optical devices (e.g., packet switching devices 201-203, optical regenerator 225) of optical characteristics to use in transmitting and/or receiving data.

For example, initially packet switching devices 201-203 and optical regenerator 225 each register their optical characteristics with the optical control layer of the optical network. As part of a first example, packet switching device 201 requests, from the optical control layer, a connection with packet switching device 202. Optical control layer determines a light path through optical network appliances 221, 222 and 223, and informs packet switching devices 201 and 202 of what optical characteristics to use in sending and receiving data, including possibly what wavelength(s). As part of a second example, packet switching device 201 requests, from the optical control layer, a connection with packet switching device 203. Optical control layer determines a light path through optical network appliances 221, 222, 223, and 224 and determines that optical regeneration is required. The optical control layer informs packet switching devices 201 and 203 as well as optical regenerator 225 of what optical characteristics to use in sending and receiving data, including possibly what wavelength(s), and initiates optical network appliances 221, 222, 223 and 224 to configure the determined light path between packet switching devices 201 and 203 through optical regenerator 225.

The list of communications capabilities that are possibly registered is extensible, and may typically include, but is not limited to, range of transmitted power, frequency characteristics, range of valid input power, supported wavelength characteristics, optical layer output power, wavelength characteristics, frequency characteristics, bit rate, modulation format, forward error correction type, signal format, and frame format characteristics. Additionally, a device may register alternatives supported by the device, possibly identifying default characteristics, and may possibly negotiate with the optical control layer of the optical network of optical characteristics to use in communicating over a light path through the optical network. Examples of protocols that can be extended to be used or directly be used in communication between a device (internal to or external to an optical network) and the optical control layer of an optical network include, but are not limited to, Link Management Protocol (LMP), XML, TL/1, Corba. The operation of one embodiment will be described in relation to each of the flow diagrams of FIGS. 4A, 4B, 5A and 5B described hereinafter.

Figure 3:
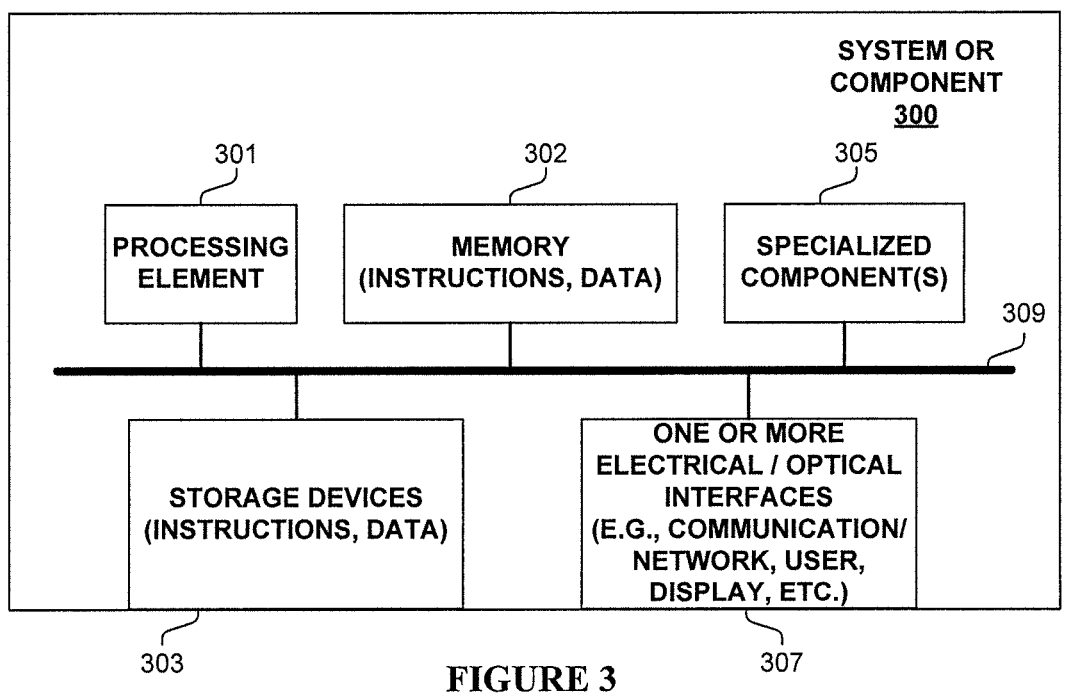
FIG. 3 illustrates an example system or component used in one embodiment.

FIG. 3 illustrates a block diagram of a system or component 300 used in one embodiment associated with registration of device characteristics with optical layer for use in establishing connections through an optical network. In one embodiment, system or component 300 performs one or more processes corresponding to one of the flow diagrams illustrated or otherwise described herein. In one embodiment, system or component 300 is used in a network device as part of the optical control layer, and/or is part of an optical layer server. In one embodiment, system or component 300 is used in a packet switching device for use in communicating with an optical control layer for registering and establishing what communication characteristics to use for a particular connection.

In one embodiment, system or component 300 includes a processing element 301, memory 302, storage devices 303, specialized components 305 (e.g. optimized hardware such as for performing operations, etc.), and interface(s) 307 for communicating information (e.g., communicating information over electrical and/or optical networks, user-interfaces, displaying information, etc.), which are typically communicatively coupled via one or more communications mechanisms 309, with the communications paths typically tailored to meet the needs of the application.

Various embodiments of component 300 may include more or less elements. The operation of component 300 is typically controlled by processing element 301 using memory 302 and storage devices 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

Figure 4A:
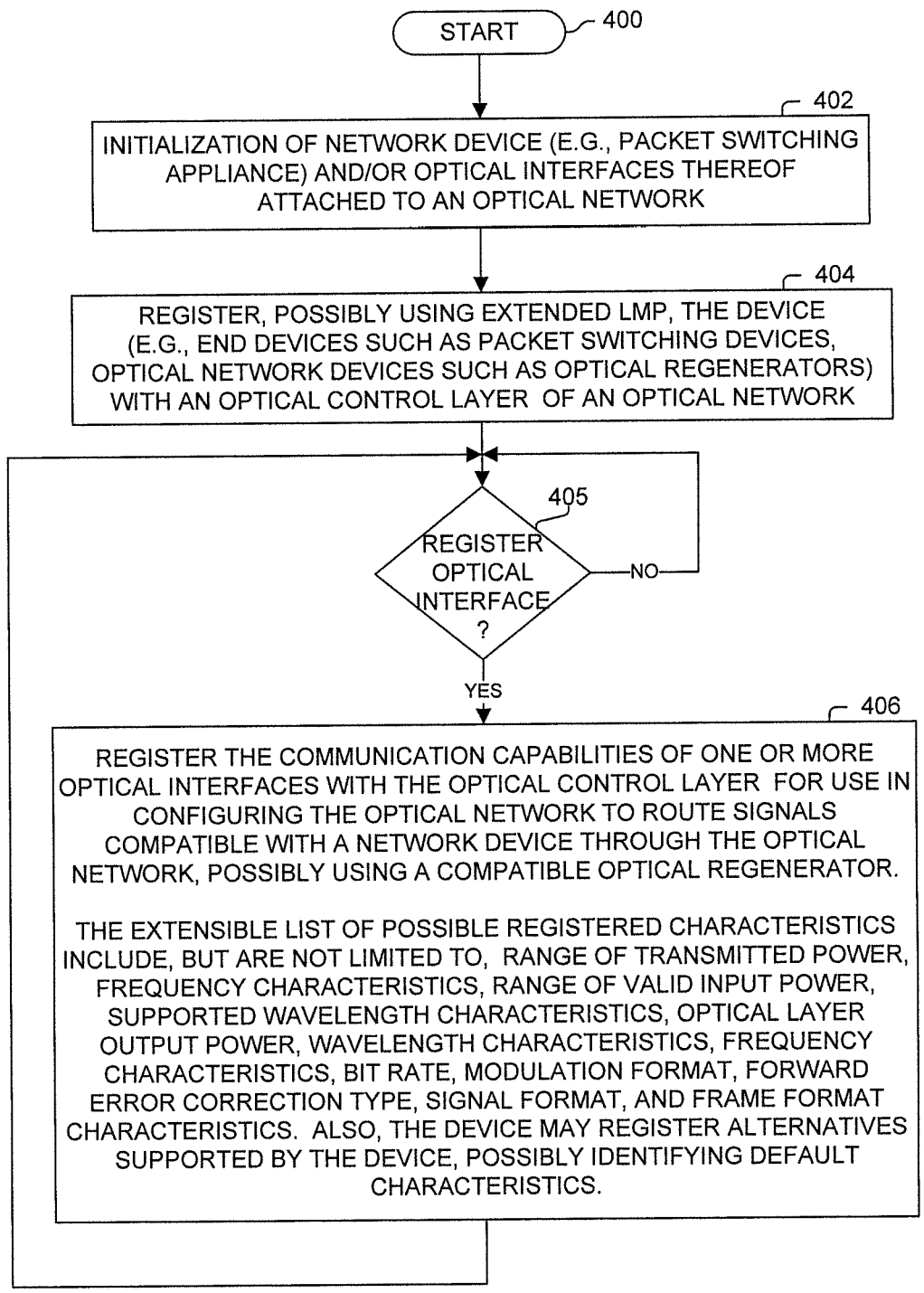
FIG. 4A illustrates a process performed in one embodiment.

FIG. 4A illustrates a process used in one embodiment of a device with one or more optical interfaces (e.g., a packet switching appliance, optical regenerator) configured for registering of its optical interface characteristics with the optical layer of an optical network for use in establishing connections through the optical network. Processing begins with process block 400. In process block 402, the device and/or its optical interfaces are initialized, thus connecting to, or becoming part of, the optical network. In process block 404, the device registers itself with the optical control layer of the optical network. As determined in process block 405, when the device has an optical interface to register with the optical control layer of an optical network (e.g., an optical interface is added to the device, is initialized, or otherwise becomes available), then process block 406 is performed. In process block 406, the device registers its communications capabilities, possibly including alternative configuration settings, of one or more of its optical interfaces with the optical control layer of an optical network for use by the optical control layer in determining compatible light paths through the optical network. The list of communications capabilities that are possibly registered is extensible, and may typically include, but is not limited to, range of transmitted power, frequency characteristics, range of valid input power, supported wavelength characteristics, optical layer output power, wavelength characteristics, frequency characteristics, bit rate, modulation format, forward error correction type, signal format, and frame format characteristics. Processing of one embodiment then returns to process block 405.

Figure 4B:
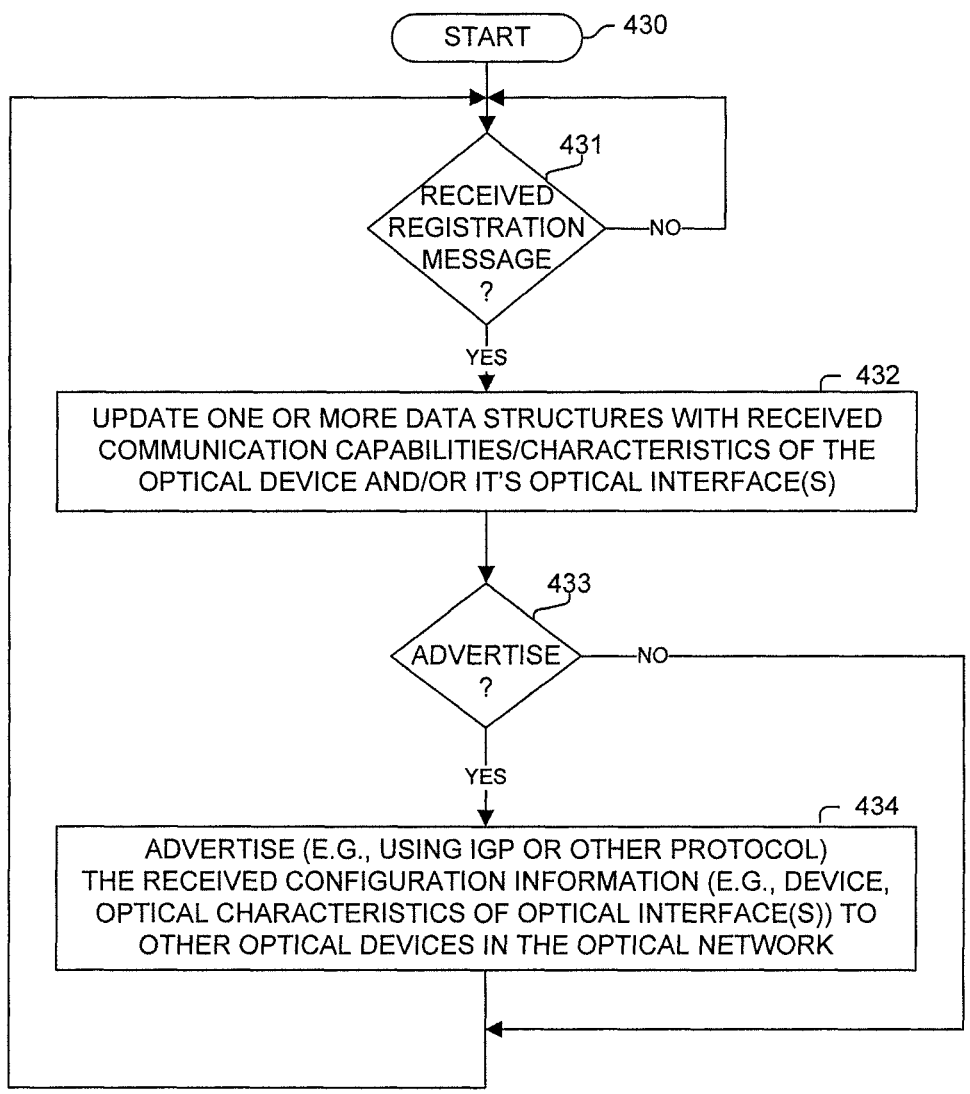
FIG. 4B illustrates a process performed in one embodiment.

FIG. 4B illustrates a process used in one embodiment of an optical control layer of an optical network. Processing begins with process block 430. As determined in process block 431, in response to a received registration message (e.g., of a device and/or one or more of its optical interfaces), then processing proceeds to process block 432. In one embodiment, this information is received over an optical network (e.g., over a supervisor wavelength). In one embodiment, this information is received over an out-of-band network. In process block 432, the optical control layer updates one or more data structures of the received device and/or registered communications capabilities of one or more of the device's optical interfaces. As determined in process block 433, if the device should advertise the registered information to other devices that are part of the optical control layer, then in process block 434, the device advertises (e.g., using IGP or another protocol) the registered information. In this manner, the configuration information is proliferated among multiple devices that are part of the optical control layer such that the optical control layer has more information when determining a light path through the optical network. In one embodiment, this information is not advertised, and the optical control layer makes hop-by-hop decisions when determining and/or configuring a light path through the optical network. Processing of the flow diagram illustrated in FIG. 4B returns to process block 431.

Figure 5A:
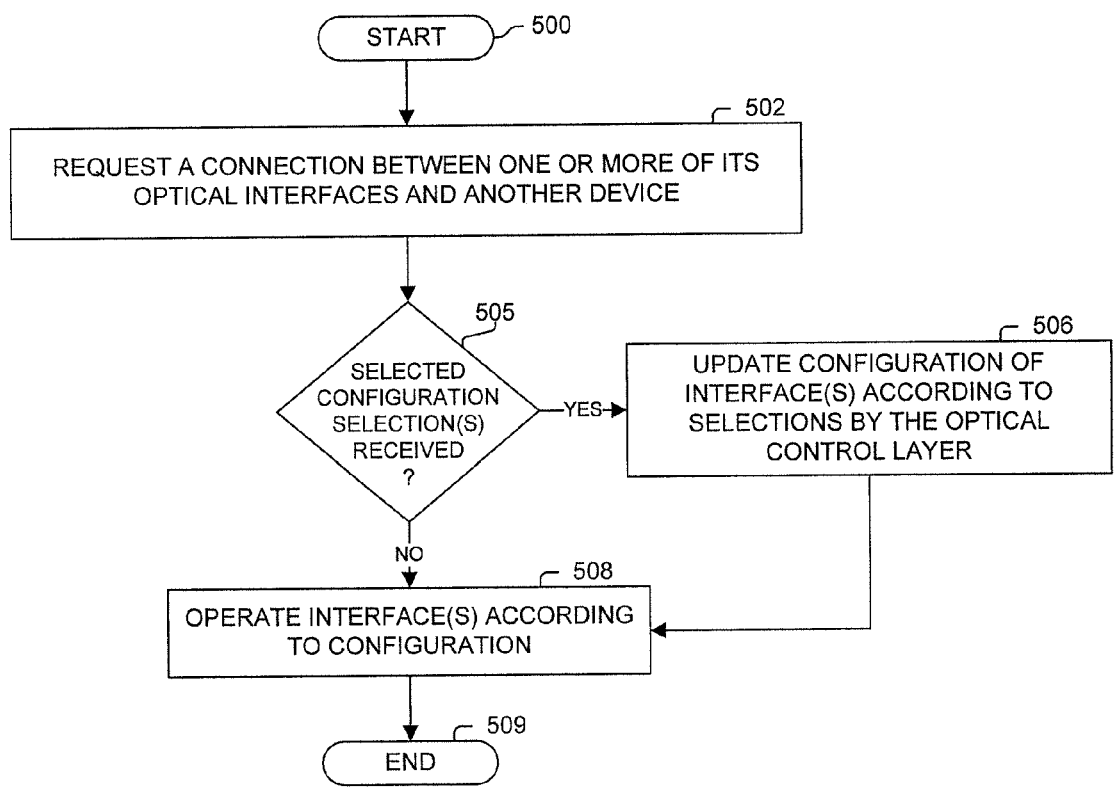
FIG. 5A illustrates a process performed in one embodiment.

FIG. 5A illustrates a process used in one embodiment of a device (e.g., packet switching device) requesting a light path through an optical network. Processing begins with process block 500, and in process block 502, a device makes a request (e.g., via Resource Reservation Protocol (RSVP) or another protocol) to the optical control layer of an optical network for a connection between one or more of its optical interfaces and another device attached to the optical network. In one embodiment, the connection request is sent over the optical network, such as over a supervisory channel. In one embodiment, the connection request is received over an out-of-band network. As determined in process block 505, if the acknowledgement message from the optical control layer, in response to the connection request, includes selected configuration information (e.g., a selection of the previously registered alternatives), then in process block 506, the device configures its optical interface(s) to operate according to the selections received from the optical control layer. In process block 508, the interfaces to the optical network operate according to their configuration. Processing of the flow diagram illustrated in FIG. 5A is complete as indicated by process block 509.

Figure 5B:
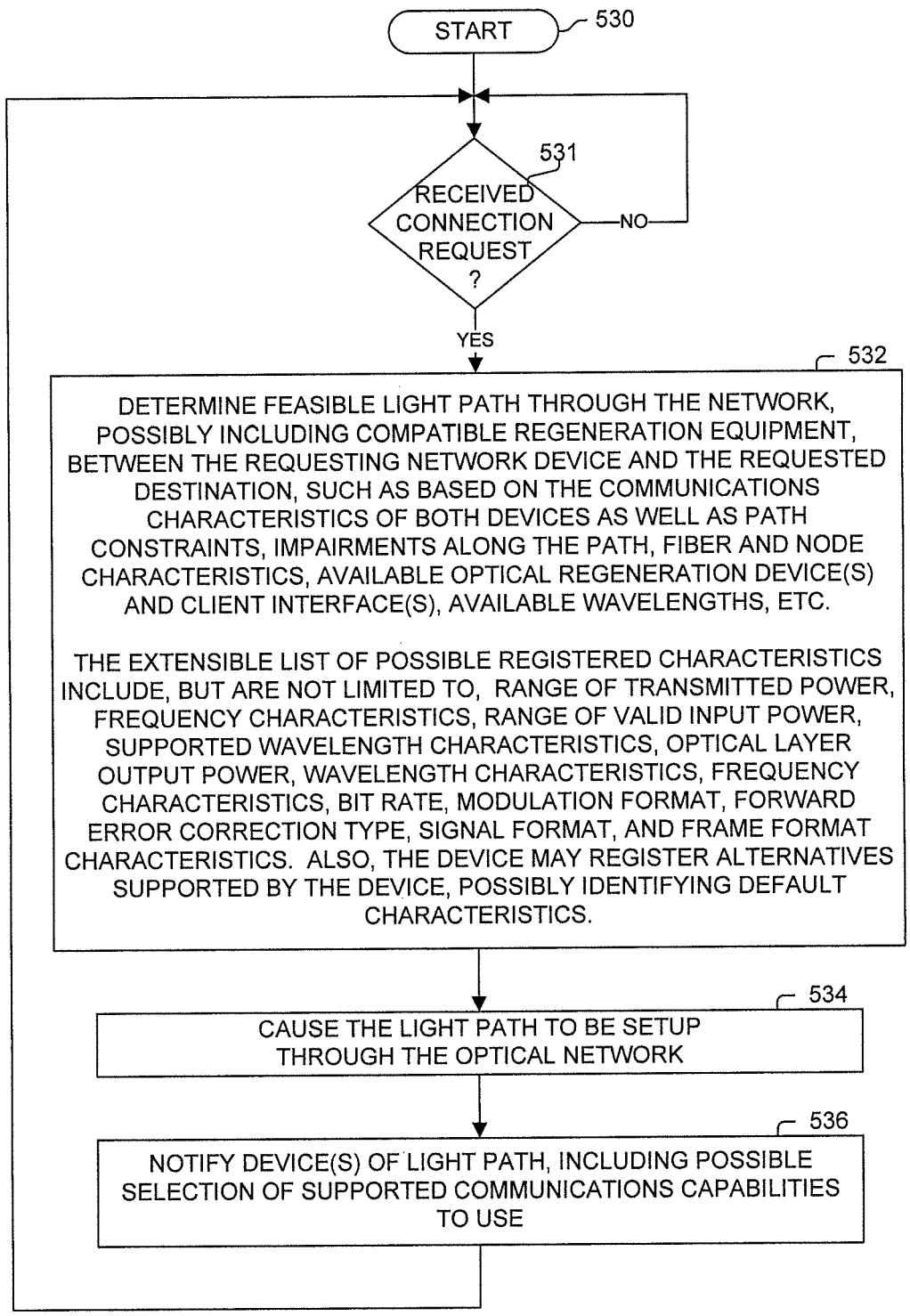
FIG. 5B illustrates a process performed in one embodiment.

FIG. 5B illustrates a process performed by the optical control layer of an optical network in one embodiment. Processing begins with process block 530. As determined in process block 531, in response to receiving a connection request, processing proceeds to perform process blocks 532-536. In process block 532, the optical control layer attempts to determine a feasible light path through the optical network that is compatible with the endpoints of the light path based on information (e.g., communication capabilities, including possible alternative configurations) registered with it about the endpoint equipment and possibly optical regenerating equipment. This determination is also typically based on path constraints, impairments along the path, fiber and node characteristics, available optical regeneration device(s) and client interface(s), available wavelengths, etc. Note, the extensible list of possible registered communications characteristics include, but are not limited to, range of transmitted power, frequency characteristics, range of valid input power, supported wavelength characteristics, optical layer output power, wavelength characteristics, frequency characteristics, bit rate, modulation format, forward error correction type, signal format, and frame format characteristics.

By having the devices register the communication capabilities of their optical interfaces with the optical control layer, the optical control layer can acquire the information directly from the equipment which allows dynamic updates of the actual capabilities of the optical equipment connected to an optical network (e.g., in response to the change-out of equipment and/or interfaces) as well as an understanding of the particulars of the implementation of the equipment and/or its interfaces, which, for example, may vary among manufactures, versions, or even different units with the same manufacturer and version of equipment. Note, in one embodiment, equipment within the optical network (e.g., optical regenerators) also registers their capabilities with the optical control layer, so that it knows of the capabilities of its network, and can provision light paths accordingly. Additionally, by having the network devices, inside and/or outside the optical network, register their communication capabilities with the optical control layer, the optical control layer can determine light paths based on actual characteristics of the devices, rather than generalized characterizations of equipment.

Next, in process block 534, the light path, determined based on the registered information of the actual devices, is configured through the optical network. In process block 536, the requesting device and possibly other endpoint is notified of the light path. In one embodiment, this notification includes parameters for configuring the network devices (e.g., one or more selections of the device's alternative configurations previously registered with the optical control layer). Processing of the flow diagram illustrated in FIG. 5B returns to process block 531.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An optical device, comprising:
   an optical interface configured for coupling with an optical fiber for communicating information using wavelength-division multiplexing (WDM) with an optical network, including over a feasible light path, with the optical interface being characterized by a plurality of communication capabilities of an optical transmitter of the optical interface, wherein said communication capabilities include optical layer transmission characteristics for the optical transmitter; and
   a controller configured to register with an optical layer server including an optical path computation engine or optical network management system for computing and configuring the feasible light path through the optical network, external to the optical device, of said communication capabilities of the optical interface for use in the optical layer server configuring the optical layer network to determine and route compatible signals with the optical device through the optical network.

2. The optical device of claim 1, wherein the optical interface includes configurable alternative values of said communication capabilities; wherein the optical device is configured to receive an identification of parameters according to said configurable alternative values from an optical control layer outside the optical device; and wherein the optical device is configured to configure the optical interface to operate according to said received parameters for communicating over the optical fiber.

3. The optical device of claim 2, wherein said optical control layer is distributed among a plurality of optical appliances in the optical network.

4. The optical device of claim 3, wherein the optical device receives the identification of parameters according to said configurable alternative values from the optical control layer in one of the plurality of optical appliances, different from the optical device, in the optical network.

5. The optical device of claim 2, wherein said optical control layer includes a centralized optical layer server.

6. The optical device of claim 1, wherein said communication capabilities that are said informed to the optical control layer for the optical transmitter include a range of transmitted power and frequency characteristics.

7. The optical device of claim 1, wherein said communication capabilities that are said informed to the optical control layer for the optical transmitter include bit rate, modulation format, forward error correction type, signal format, or frame format characteristics.

8. The optical device of claim 1, wherein the optical device is a router appliance.

9. An optical device, comprising:
   an optical interface configured for coupling with an optical fiber for communicating information using wavelength-division multiplexing (WDM) with an optical network including over a feasible light path, with the optical interface being characterized by a plurality of communication capabilities of a receiver of the optical interface, wherein said communication capabilities include optical layer receiving characteristic for the optical receiver; and
   a controller configured to register with an optical layer server including an optical path computation engine or optical network management system for computing and configuring the feasible light path through the optical network, external to the optical device, of said communication capabilities of the optical interface for use in the optical layer server configuring the optical layer network to determine and route compatible signals with the optical device through the optical network.

10. The optical device of claim 9, wherein the optical interfaces has configurable alternative values of said communication capabilities; wherein the optical device is configured to receive an identification of parameters according to said configurable alternative values from the optical an optical control layer outside the optical device; and wherein the optical device is configured to configure the optical interface to operate according to said received parameters for communicating over the optical fiber.

11. The optical device of claim 10, wherein said optical control layer is distributed among a plurality of optical appliances in the optical network.

12. The optical device of claim 9, wherein the optical server is configured to perform path computations within the optical network based on optical characteristics registered with the optical server including said communication capabilities of the optical interface.

13. The optical device of claim 9, wherein said communication capabilities that are said informed to the optical control layer for the optical receiver include a range of valid input power and supported wavelength characteristics.

14. The optical device of claim 9, wherein said communication capabilities that are said informed to the optical control layer for the optical receiver include bit rate, modulation format, forward error correction type, signal format, or frame format characteristics.

15. An optical device, comprising:
   an optical network interface coupled to an optical network including a plurality of network appliances, wherein each of the plurality of network appliances includes one or more particular optical interfaces configured for coupling with the optical network for communicating information using wavelength-division multiplexing (WDM), with each of said one or more particular optical interfaces being characterized by a plurality of communication capabilities of its optical transmitter or receiver, with said communication capabilities including optical layer transmission characteristics for said optical transmitter and optical layer receiving characteristics for said optical receiver;
   wherein the optical device is configured to determine compatible light paths through the optical network optically communicatively coupling one or more pairs of network appliances of the plurality of network appliances based on received communication capabilities of said optical interfaces of the plurality of network appliances, and to cause the optical network to provide said at least one of said determined compatible light paths in response to said determining compatible light paths through the optical network.

16. The optical device of claim 15, wherein said communication capabilities that are said received from each of the plurality of network appliances include one or more of a group of communication capabilities consisting of: range of transmitted power, range of valid input power, and supported wavelength characteristics.

17. A method, comprising:
   receiving, by an optical control layer of an optical network from each particular network device of a plurality of network devices communicatively coupled with the optical network, a registration of a plurality of selectable communication capabilities of the optical transmitters and optical receivers for communicating information by said particular network device over the optical network using wavelength-division multiplexing (WDM), with said communication capabilities including optical layer transmission characteristics for an optical transmitter and optical layer receiving characteristics for an optical receiver;
   determining, by the optical control layer, a feasible light path through the network based on compatible communications capabilities for communicating with each other over the optical network of two particular network devices of the plurality of network devices from said registered selectable communication capabilities of said two particular network devices; and
   communicating, by the optical control layer, respective said compatible communications capabilities to each of said two particular network devices for configuration by said two particular network devices for communicating over the feasible light path.

18. The method of claim 17, comprising: causing the optical network to provide a compatible light path through the optical network between said two particular network devices.

19. The method of claim 18, wherein said causing the optical network to provide a compatible light path through the optical network between said two particular network devices includes causing the optical network to provide said compatible light path through an optical regenerator.

20. The method of claim 19, wherein the plurality of network devices includes the optical regenerator; and wherein the method comprises: selecting compatible communications capabilities of the optical regenerator from said registered selectable communication capabilities of the optical regenerator for said two particular network devices to communicate over the optical network.

* * * * *

UNITED STATES PATENT AND TRADEMARK OFFICE
CERTIFICATE OF CORRECTION

| | | |
|---|---|---|
| PATENT NO. | : 8,903,241 B2 | Page 1 of 1 |
| APPLICATION NO. | : 13/956038 | |
| DATED | : December 2, 2014 | |
| INVENTOR(S) | : Gerstel et al. | |

It is certified that error appears in the above-identified patent and that said Letters Patent is hereby corrected as shown below:

In The Claims

Col. 11, Claim 10, line 27, replace "the optical an optical" with -- an optical --

Signed and Sealed this
Seventeenth Day of March, 2015

Michelle K. Lee
*Director of the United States Patent and Trademark Office*